ROBERT FORMAN, OF NORMAL, ILLINOIS.

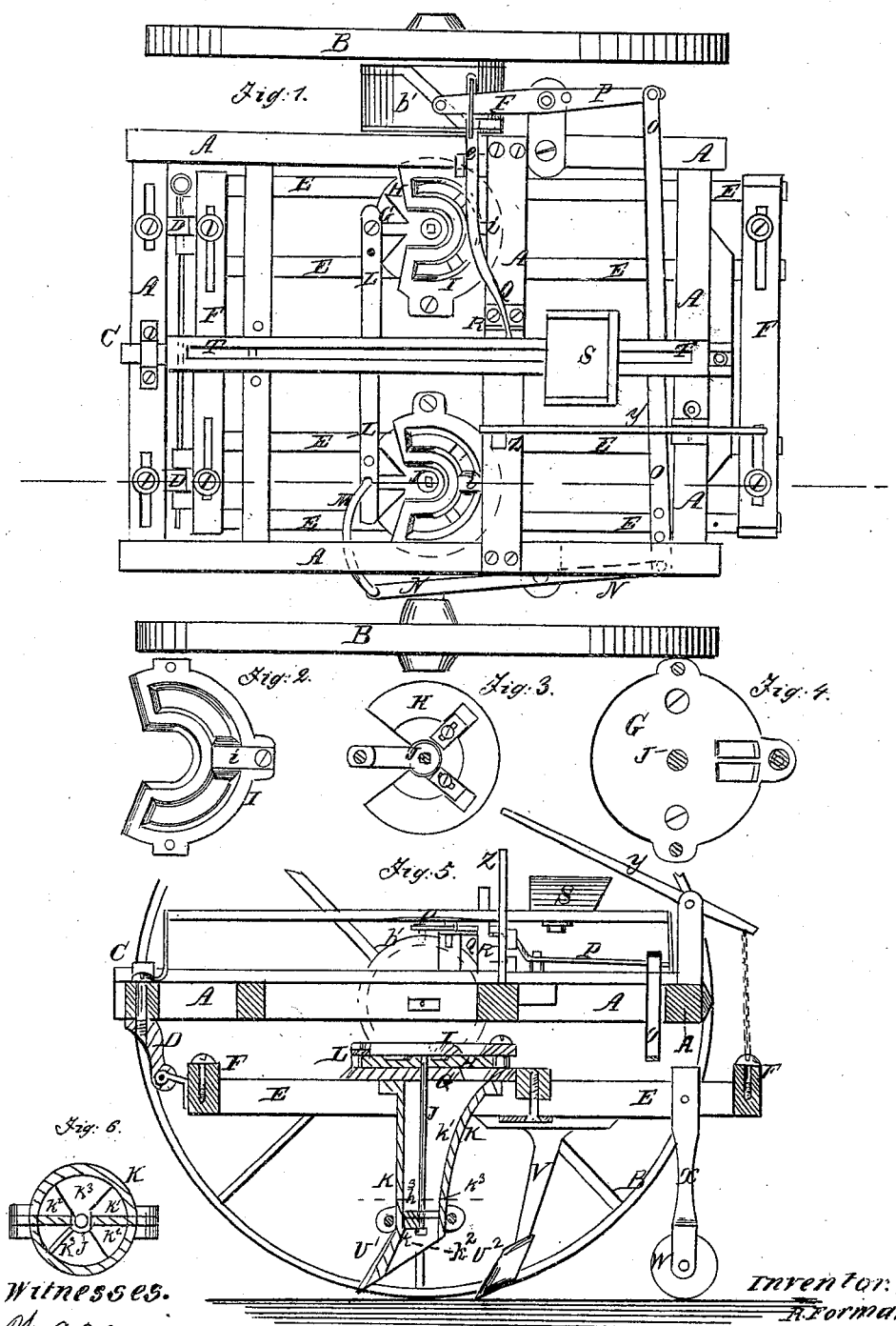

Letters Patent No. 92,297, dated July 6, 1869.

---

IMPROVEMENT IN CORN-PLANTERS.

---

The Schedule referred to in these Letters Patent and making part of the same.

---

*To all whom it may concern:*

Be it known that I, ROBERT FORMAN, of Normal, in the county of McLean, and State of Illinois, have invented a new and useful Improvement in Corn-Planters; and I do hereby declare that the following is a full, clear, and exact description thereof, which will enable those skilled in the art to make and use the same, reference being had to the accompanying drawings, forming part of this specification, in which—

Figure 1 is a top or plan view of my improved machine.

Figures 2, 3, and 4, are detail views of the parts of the upper dropping-device.

Figure 5 is a detail sectional view of the machine, taken through the line $x\ x$, fig. 1.

Figure 6 is a detail sectional view, taken through the line $y\ y$, fig. 5, showing the lower dropping-device.

Similar letters of reference indicate corresponding parts.

My invention has for its object to furnish an improved automatic corn-planter, simple in construction, accurate and effective in operation, and easily operated; and It consists in the construction and combination of various parts of the machine, as hereinafter more fully described.

A is the main frame of the machine, to the middle parts of the side bars of which are securely attached the axles, or journals upon which the wheels B revolve, and to the forward part of which is secured the tongue C.

D are supports, or arms, the upper ends of which are adjustably secured to the front cross-bar of the frame A by bolts passing up through slots in the said cross-bar, as shown in fig. 1, so that the said standards, or supports may be moved closer together or further apart, to enable the distance apart of the rows of hills to be regulated as desired.

To the lower ends of the arms D are pivoted the forward ends of the frames E, to which the plow-standards and dropping-devices are attached, and each of which frames consists of two longitudinal bars, connected by two or more short cross-bars.

The two frames E are adjustably connected with each other at their front and rear ends by the cross-bars F, by means of bolts passing through slots in the said bars F, so that the said frames E may be moved closer together or further apart, to regulate the distance apart of the rows of hills.

The upper dropping-device consists of three plates, G H I, the lower one, G, of which is securely and immovably attached to the frame E, has two slots formed through its rear part, for the passage of the seed, as shown in fig. 4, and has a round hole formed through its centre, through which passes and in which works the shaft J.

The middle plate H has a square hole formed through its centre, to receive the squared upper end of the shaft J, so that it may carry the said shaft with it in its oscillations.

The rear part of the plate H has two slots formed in it, the size of which may be regulated at pleasure by means of adjustable sliding blocks, according to the amount of seed required for a hill, and which slots are so arranged that they may be brought alternately over one or the other of the slots of the plate G, to allow the seed to pass down through the said plate G into the conductor-spout.

The forward part of the plate H may, if desired, be cut away, as shown in fig. 3, leaving an arm, to the end of which is pivoted the connecting-bar, by means of which the said plate is oscillated, as hereinafter described.

I is the upper plate, the forward and middle parts of which may, for convenience, be cut away, and which is supported in position, and securely and immovably connected with the frame E, by studs or bolts.

The plate I has a curved, or semicircular slot formed through it, to allow the seed to come in contact with the oscillating plate H, and enter the holes formed in said plate, as before described.

The middle part of the curved slot in the plate I, directly above the slots in the plate G, is covered with a plate, $i$, having wings, or flanges formed upon its sides, projecting downward to, or nearly to the plate H, and fitting into the slot in the plate I, so as to prevent the plate H from carrying forward to the slots in the plate G any more seed than what may be in the holes in the said plate H.

The dropping-device G H I is covered with a seed-box, or hopper, which is not shown in the drawings, and about the construction of which there is nothing new.

K are the conductor-spouts, which are attached to the frames E directly beneath the dropping-devices G H I, so as to receive the seed from the said dropping-devices, and conduct it to the ground.

The spouts K are divided longitudinally into two parts by the partition $k^1$, which said partition is slotted longitudinally, to receive the shaft J, the lower end of which works in a step formed in or attached to the interior of the spouts K, at the lower end of the partition $k^1$.

$k^2$ are horizontal flanges formed upon or attached to the interior of the lower part of the spouts K, and which are made in about the shape of a quarter of a circle, as shown in fig. 6, so as to leave an opening between their edges, upon each side of the partition $k^1$, for the passage of the seed.

$k^3$ is a valve-plate, made in about the shape of a half circle, and which is securely and rigidly attached to the lower part of the shaft J, so as to be moved to close the opening upon one or the other side of the partition $k^1$, as the said shaft J is operated by the movement of the plate H.

It should be observed, that as the seed is dropped by the operation of the upper dropping-device into one of the compartments of the spout K, the discharge-orifice at the lower end of that compartment is closed, so that as the seed is passing into one compartment of said spout, the seed previously introduced may be passing from the other compartment to the ground.

L is a cross-bar, to which the ends of the arms of the two plates H are pivoted, so that the said plates may be operated at the same time and together.

To one end of the connecting-bar L is pivoted one end of the connecting-rod M, the other end of which is pivoted to the forward end of the lever N, which is pivoted to a support attached to one of the frames E.

To the other or rear end of the lever N is pivoted one end of the connecting-rod O, the other end of which is pivoted to the rear end of the lever P.

The lever P is pivoted to the frame A, or to a support attached to said frame, in such a position that its forward end may rest upon the inner part $b^1$ of the hub of one of the wheels B.

The forward end of the lever P has a downwardly-projecting finger, or pin attached to it, which enters the zigzag groove formed in the enlargement $b'$ of the inner end of the hub of one of the wheels B, as shown in figs. 1 and 5, so that the dropping-devices may be operated by the advance of the machine.

If desired, the enlargement $b'$ may be a separate piece or wheel, secured to the inner end of the hub of the wheel.

Q is a lever, pivoted to a support attached to the frame A; and through a slot formed in or through a keeper attached to the outer end of said lever, passes the forward end of the lever P.

The other or inner end of the lever Q extends inward, into such a position that it may be reached and operated by the driver from his seat.

R is a stop-catch attached to the frame A, in such a position as to receive and hold the free end of the lever Q, both when holding the lever P in gear and when holding it out of gear with the enlarged hub $b'$.

S is the driver's seat, which is adjustably attached to the slotted bar T, the ends of which are secured to supports attached to the front and rear parts of the frame A, so that by adjusting the position of the seat S, the driver may bring his weight over any desired part of the machine.

The forward parts of the lower ends of the spouts K are so formed as to open a furrow to receive the seed, or they may have plows $U^1$ attached to them, for that purpose.

The seed is covered by the covering-plows $U^2$, attached to the lower ends of the standards V, the upper ends of which are securely attached to the frames E, a little in the rear of the conductor-spouts K.

The soil over the seed is pressed down and smoothed off by the rollers W, the faces of which should be made concave, and which are pivoted to the lower ends of the standards X, the upper ends of which are secured to the frames E in proper position, in the rear of the standards V.

Y is a lever, pivoted to a support attached to the rear part of the frame A, and the rear end of which is connected with the rear parts of the frames E, by a short connecting-chain.

The forward end of the lever Y extends forward into such a position that it may be conveniently reached and operated by the driver from his seat.

Z is a catch-bar attached to the frame A, in such a position that it may receive and hold the forward end of the lever Y, both when the machine is working and when the plows have been raised from the ground by operating the said lever.

I claim as new, and desire to secure by Letters Patent—

1. The combination of the partition $k'$, dropping-device $k^2$ $k^3$, and shaft J, with the conductor-spout K and plate H of the dropping-device G H I, substantially as herein shown and described, and for the purpose set forth.

2. The combination of the connecting-bar L, connecting-rod M, lever N, connecting-rod O, lever P, and hub-enlargement or wheel $b'$, having a zigzag groove formed in it, with each other, with the plates H of the dropping-device G H I, and with the frames E, frame A, and wheel B, substantially as herein shown and described, and for the purpose set forth.

ROBERT FORMAN.

Witnesses:
A. C. SHURTLEFF,
S. M. SHURTLEFF.